J. KOENIG.
FLASK FOR LIQUIDS.
APPLICATION FILED APR. 4, 1917.
Reissued Apr. 29, 1919. 14,641.
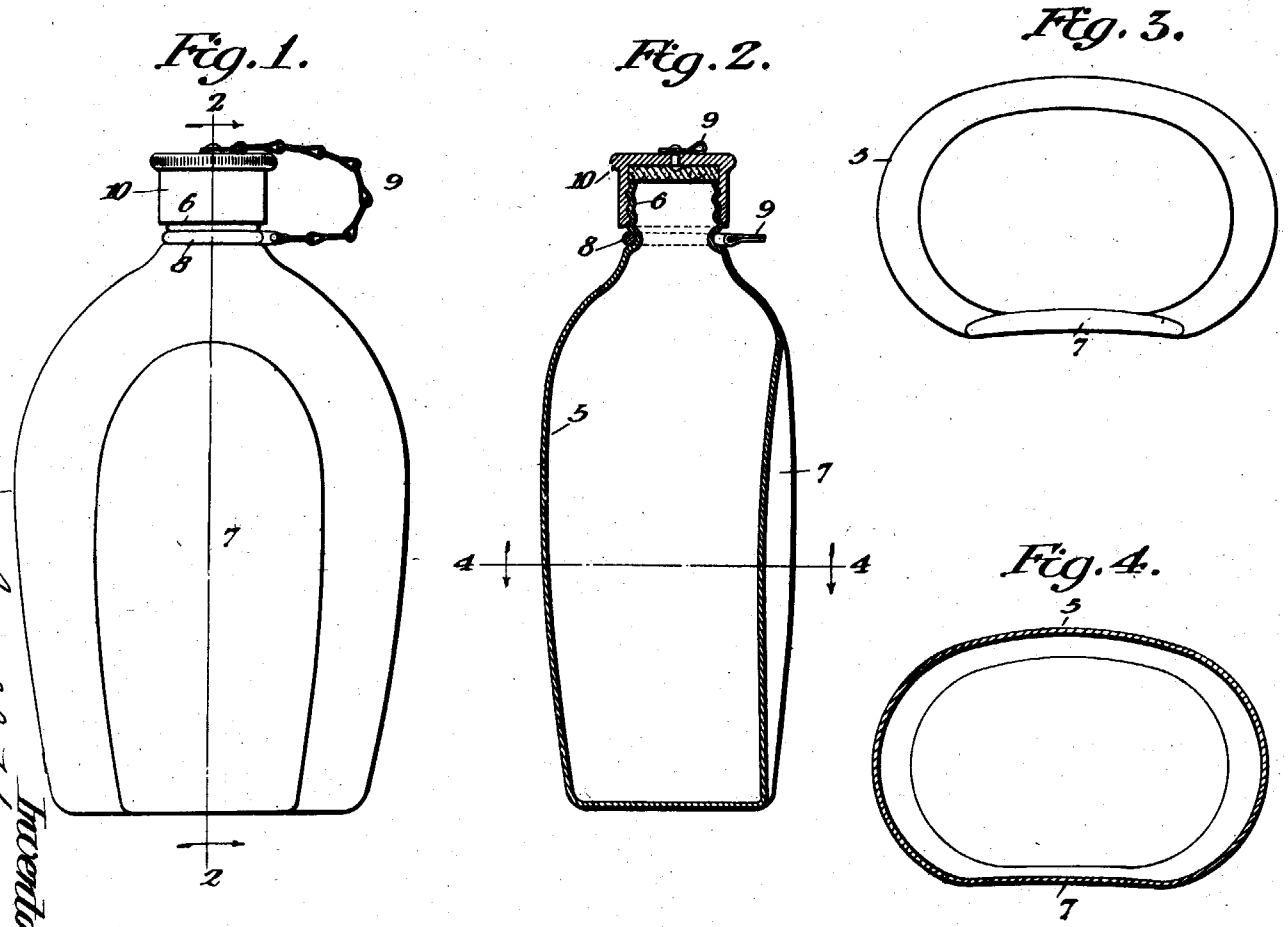
Inventor:
Joseph Koenig.
By R. S. C. Caldwell
Attorney.
H.E. NORRIS PETERS CO., PHOTO-LITHO., WASHINGTON, D. C.

UNITED STATES PATENT OFFICE.

JOSEPH KOENIG, OF TWO RIVERS, WISCONSIN.

FLASK FOR LIQUIDS.

14,641. Specification of Reissued Letters Patent. Reissued Apr. 29, 1919.

Original No. 1,062,716, dated May 27, 1913, Serial No. 621,809, filed April 18, 1911. Application for reissue filed April 4, 1917. Serial No. 159,798.

*To all whom it may concern:*

Be it known that I, JOSEPH KOENIG, a citizen of the United States, and resident of Two Rivers, in the county of Manitowoc and State of Wisconsin, have invented certain new and useful Improvements in Flasks for Liquids; and I do hereby declare that the following is a full, clear, and exact description thereof.

The main object of my invention is to provide simple, economical, non-corrosive, anti-leak canteens designed to be comfortably carried upon the persons of soldiers and which will stand mouth up upon the ground, a mess table, or other support, said invention consisting in a one-piece, seamless, metal flask having a flat bottom and a preferably screw-threaded cylindrical neck; its general contour between the bottom and neck being hereinafter described.

In the accompanying drawings:

Figure 1 represents a side elevation of a canteen in accordance with my invention;

Fig. 2, a sectional view of the same on the plane indicated by line 2—2 in Fig. 1;

Fig. 3, a plan view of said canteen inverted, and,

Fig. 4, a horizontal section of the same on the plane indicated by line 4—4 in Fig. 2.

Referring by numerals to the drawings, 5 indicates the body of a flask that constitutes a canteen in accordance with my invention. This flask-like canteen is designed to be made from a single piece of aluminum without seam, in order to be non-corrosive and anti-leak. Its bottom is flat and it is provided with a screw-threaded cylindrical neck 6.

The general contour of the body of the canteen in horizontal section at any plane intermediate of its bottom and neck is for the most part elliptical, one side being dished to form a concavity 7 extending upward from the bottom to a predetermined height.

The canteen is gradually widened upward from the bottom to approximately one-half its height and then gradually decreased in width up to the beginning of its neck, as is herein shown.

The canteen has one of its sides cancave in order that it may readily conform to the curvature of the person carrying the same, and its bottom is flat so that it may stand alone. A swivel-ring 8 is shown engaging an outer annular groove in the neck of the canteen, and a chain 9 in connection with said ring has swivel connection with a screw-cap closure 10 for said neck.

I am aware that it is not novel to make a one piece, flat bottom and seamless sheet-metal receptacle for liquids. I am also aware that it is not novel to make a rounded lower end metal or glass flask or bottle having its body concave upon one side between said end thereof and its neck, its body being of otherwise generally elliptical contour in horizontal section intermediate of the extremes aforesaid.

It is not at all difficult to make receptacles as aforesaid, but it has required invention and a great deal of expensive experiment to make a one piece sheet metal flask-like canteen having a flat bottom and one side of its body concave from said bottom to a predetermined height above the same, as the product of a method set up in my application Serial No. 672,655, filed January 22, 1912. In brief, the method aforesaid consists in drawing operations to reduce a single flat sheet of metal to a cup form of predetermined dimensions; taperingly reducing the diameter of a lower portion of the cup and at the same time imparting thereto a more tapering ellipsoidal form below the reduction aforesaid; pressing and flattening its lower portion and bottom into the shape and dimensions of the finished canteen and at the same time forming a concave depression in one side of said expanded portions of said cup; spinning in of the then upper round portion of the product and terminating the same at the top in a cylindrical neck; molding the round portion of the product below its neck to convert the same into the ellipsoidal contour of said finished canteen as well as to upwardly extend the aforesaid concave depression; and finally screw-threading said neck.

While in these specifications I have used the term "canteen" as applied to my new article of manufacture, it is obvious that the flask-like bottle herein shown and described may be worn on the body of the person and be used to contain liquid whether such liquid is for drinking or other purposes.

I claim:

1. An improved article of manufacture, consisting of a one-piece, seamless-body, sheet metal, flask-like canteen, having a flat bottom and a side thereof concave from said bottom to a predetermined height above the same.

2. An improved article of manufacture, consisting of a one-piece, seamless-body, sheet metal, flask-like bottle for liquids, having a flat bottom adapting it for ready filling and a side thereof concave from said bottom to a predetermined height above the same to conform to the curvature of the body when worn on the person.

In testimony that I claim the foregoing I have hereunto set my hand at Two Rivers, in the county of Manitowoc, and State of Wisconsin, in the presence of two witnesses.

JOSEPH KOENIG.

Witnesses:

LULU JACOBSON,

H. L. VITS.

Copies of this patent may be obtained for five cents each, by addressing the "Commissioner of Patents, Washington, D. C."